United States Patent [19]

Anderson

[11] 4,157,120
[45] Jun. 5, 1979

[54] ROTARY IMPACT MECHANISM HAVING A SPRING ACCELERATED INERTIA MEMBER

[75] Inventor: J. Edward C. Anderson, Moreland Hills, Ohio

[73] Assignee: Marquette Metal Products Co., Cleveland, Ohio

[21] Appl. No.: 913,245

[22] Filed: Jun. 6, 1978

Related U.S. Application Data

[63] Continuation of Ser. No. 813,072, Jul. 5, 1977, abandoned.

[51] Int. Cl.² ............................................. B25D 15/00
[52] U.S. Cl. .......................................... 173/93; 81/52.3
[58] Field of Search ................ 173/93, 93.5; 81/52.3, 81/52.35

[56] References Cited

U.S. PATENT DOCUMENTS

| | | | |
|---|---|---|---|
| 2,476,043 | 7/1949 | Hogan et al. | 173/93 |
| 2,661,647 | 12/1953 | Swenson | 173/93.5 |
| 2,844,982 | 7/1958 | Swenson | 173/93.5 |
| 2,954,714 | 10/1960 | Swenson | 173/93.5 |
| 3,273,428 | 9/1966 | Rudeke | 81/52.3 |

FOREIGN PATENT DOCUMENTS 1503043 10/1969 Fed. Rep. of Germany ............ 81/52.3

*Primary Examiner*—Lawrence J. Staab
*Attorney, Agent, or Firm*—Arthur Frederick

[57] ABSTRACT

The rotary impact mechanism has a plurality of helical springs disposed adjacent to the outer peripheral surface of a rotary inertia member which springs are anchored at one end to the inertia member and at the opposite end to a rotary driving input member so that upon relative rotative movement between the input and inertia members the springs are loaded and thereafter function to rotatively drive the inertia member. The inertia member carries at least one pawl which is capable of engagement and disengagement from a driven, toothed, output member, the pawl impacting against a tooth of the output member to drive the latter when the inertia member is rotatively driven by the springs.

10 Claims, 9 Drawing Figures

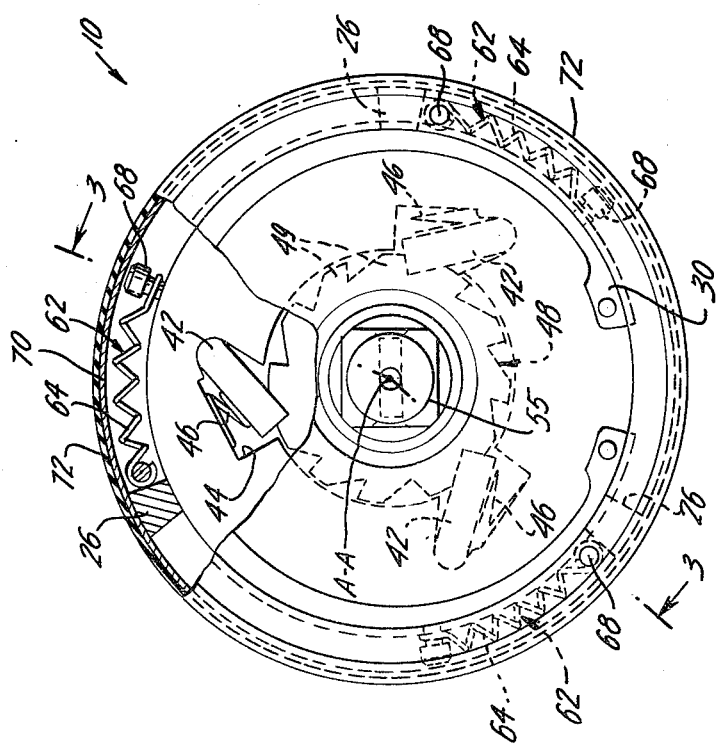

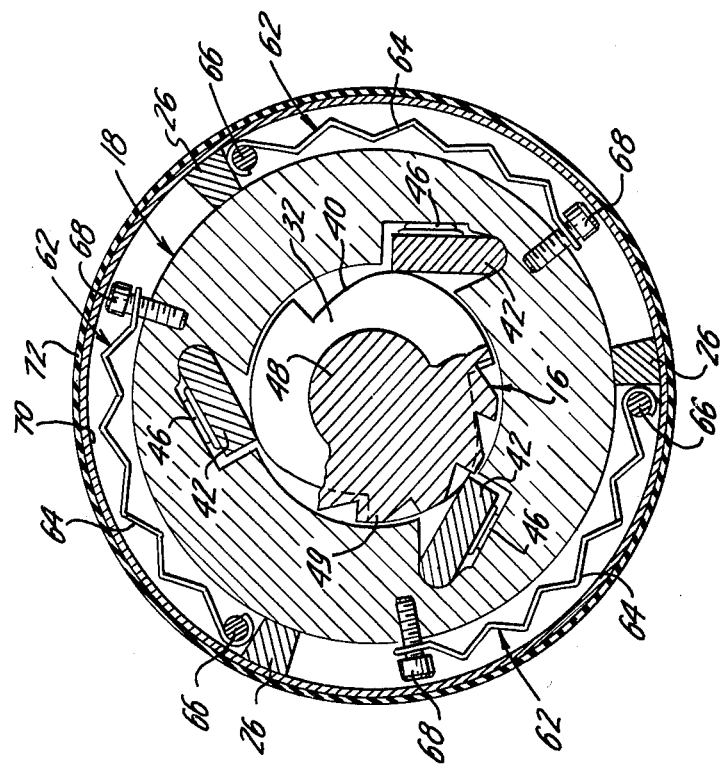
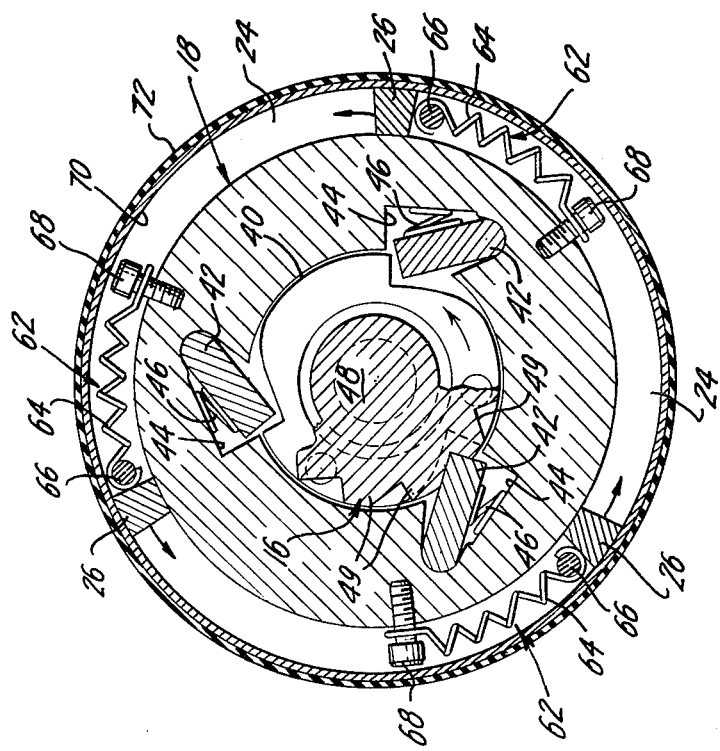

ROTARY IMPACT MECHANISM HAVING A SPRING ACCELERATED INERTIA MEMBER

This is a continuation of application Ser. No. 813,072, filed July 5, 1977, now abandoned.

This invention relates to rotary impact tools and more specifically to rotary impact tools of the type disclosed in the U.S. Pat. No. 3,156,309, to Swenson, dated Nov. 10, 1964.

In impact mechanisms of the type disclosed in the above mentioned patent, an input member, an output member and an inertia member are arranged in approximate symmetry about a common axis and journaled upon each other at mating, mutually telescoping circular surfaces for independent angular movement about the common axis. The output member has a plurality of circumferentially spaced teeth and the inertia member carries at least one pawl which is biased for engagement with the teeth and capable of movement to disengage the teeth. A cam is provided on the input member which coacts with the pawl upon relative angular movement of the input member and inertia member to disengage the pawl from a tooth of the teeth of the output member and release the pawl for impact engagement with another tooth to rotatively drive the output member. A spiral-shaped spring or springs are arranged to extend spirally outwardly of the common axis and to be connected to the input member at one end or ends and at the other end or ends to the inertia member. The springs store energy or are "loaded" upon relative rotative movement between the inertia member and input member, which energy is released to drive the inertia member and the pawl carried by the latter into rotative impact against another tooth of the teeth of the output member.

The disadvantage of impact tools of the type above described is that the torque force deliverable by the device is factory adjusted. Such factory adjustment does not make the tool capable of effectively tensioning bolts correctly in any size or grade within the tool's range. This disadvantage has been obviated by the present invention wherein field adjustments, other than change in spring preloading, can be made quickly and easily commensurate with the size or grade bolts being tightened.

Therefore, one of the objects of this invention is to provide a rotary impact mechanism which is capable of effectively tensioning fasteners correctly in relation to their size and grade within the range of the mechanism.

Another object of the present invention is to provide a rotary impact mechanism capable of having a continuously rotating input and thereby providing a greater energy output than comparable impact tools having intermittent rotary input.

A further object of this invention is to provide a rotary impact mechanism which is a unitary assembly capable of quick and easy attachment to or detachment from a source of rotary power, such as an electric or fluid motor.

SUMMARY OF INVENTION

Accordingly, the present invention contemplates an improved rotary impact mechanism of the type having, as disclosed in the U.S. Pat. No. 3,156,309, to Swenson, dated Nov. 10, 1964, an input member, an output member and an inertia member which are approximately symmetrically arranged about a common axis and journaled upon each other at mating, mutually telescoping, circular surfaces thereof for independent angular movement about the common axis. The output member has a plurality of circumferentially-spaced teeth. The inertia member carries at least one pawl which is biased for engagement with the teeth of the output member and capable of movement out of engagement with the teeth. A cam is provided on the input member for rotative movement with the latter and operative on the pawl, as a function of relative angular movement of the input and inertia members, in the direction to force the pawl out of engagement with one tooth of the teeth of the output member and release the pawl for impact engagement with another tooth and thereby rotatively drive the output member.

The improvement, according to this invention, comprises a plurality of helical springs which are disposed adjacent the outer peripheral surface of the inertia member. Each of the springs is anchored at one end to the inertia member and, at the opposite end, to the input member so that, upon relative rotative movement between the input and inertia members, the springs store energy and thereafter release such energy to rotatively drive the inertia member when the pawl disengages from the tooth.

These springs are capable of removal and replacement in the field to thereby change the energy output of the rotary impact mechanism to come within the range for correct tensioning of the fasteners to be tightened.

The input member of the rotary impact mechanism, according to one embodiment of the invention, may be constructed and arranged for connection to a continuously rotating source of power, as for example, an electric or fluid motor. This produces greater output energy according to the formula $E = \frac{1}{2}MV^2$ wherein "V" is velocity obtained from formula $V = \sqrt{2as}$ wherein "a" is acceleration produced by the spring force F in the formula $F = Ma$;

"s" is the distance between the teeth of the output member;

"M" is the mass of the inertia member.

With continuous rotating input the inertia member is accelerated faster to thus deliver more energy to the output member.

In another embodiment, the rotary impact mechanism may include a handle for manual operation of the mechanism.

BRIEF DESCRIPTION OF THE DRAWINGS

The invention will be more fully understood from the following detailed description thereof when considered in connection with the accompanying drawings wherein several embodiments of the invention are illustrated by way of example and in which:

FIG. 2 is an end elevational view of the rotary impact mechanism shown in FIG. 1, on a somewhat enlarged scale and with parts broken away for illustration purposes only;

FIG. 3 is a cross-sectional view taken substantially along line 3—3 of FIG. 2;

FIG. 4 is a view in cross-section taken along line 4—4 of FIG. 3;

FIG. 5 is a cross-sectional view, similar to FIG. 4, showing another operative position of the mechanism;

DESCRIPTION OF PREFERRED EMBODIMENTS

Figure 1:
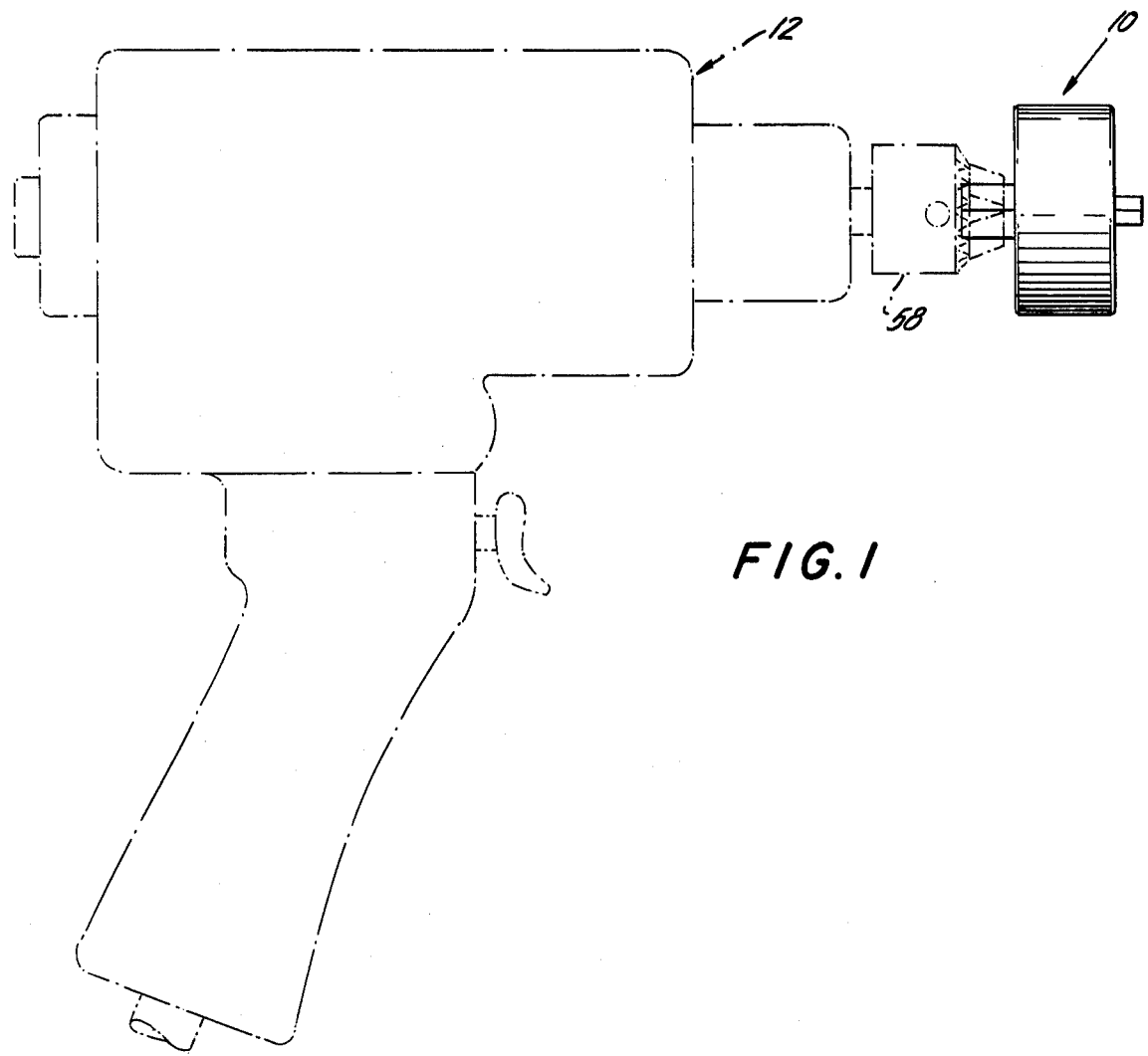
FIG. 1 is a side elevational view of a rotary impact mechanism according to a first embodiment of the invention, connected to be driven by a motor shown in phantom lines.

Now, referring to the drawings and more specifically to FIGS. 1 to 5, the reference number 10 generally designates a rotary impact mechanism, according to a first embodiment of the present invention. This mechanism 10 can be, as shown, attached to and driven by a source of continuous rotary power as, for example, an electric, hydraulic or pneumatic motor 12, shown in phantom lines in FIG. 1.

As best shown in FIGS. 2 and 3, mechanism 10 comprises, in general, a housing or input member 14, an output member 16 and a rotor or inertia member 18 arranged about a common axis A—A and journaled upon each other at mating, mutually telescoping, circular surfaces thereof. A spring assembly is provided to interconnect inertia member 18 and input member 14 and to store energy upon relative angular movement between those members and accelerate inertia member 18, the spring assembly being more fully described hereinafter.

The housing or input member 14 has a cylindrical shape with a ring-shaped portion 22 connected to an axially spaced disk-shaped portion 24 by a plurality of circumferentially-spaced, axially-extending ribs 26 (See FIGS. 2 and 4). An end plate 28 is secured against axial movement to ring-shaped portion 22 by a snap ring 30. Two cams 32 and 34 are respectively secured by rivets 36 to portion 24 and end plate 28. Each of the cams 32 and 34 are coaxial with axis A—A and have coaxial bores 38 in which is journaled output member 16. As best shown in FIGS. 4 and 5, each cam 32 and 34 has an outer peripheral camming surface 40. Within the annular space defined between input member 14 and output member 16 is disposed a rotor or inertia member 18. To insure proper angular orientation of cams 32 and 34 to each other and prevent rotation of plate 28, a pin 41 is mounted on ring portion 22 so as to project radially inwardly and coact with a notch 43 in the peripheral surface of end plate 28 (See FIG. 3).

The inertia member 18 is doughnut-shaped and coaxially surrounds output member 16 and fits within ribs 26 of input member 14. The inertia member is free to rotatively move relative to the output and input members. The inertia member carries a plurality of circumferentially-spaced pawls 42 (three being shown in the drawings). Each of the pawls 42 is pivotally mounted in a recess 44 in the inner peripheral surface of the inertia member. A pair of conical-shaped springs 46 are disposed in each recess 44 to bias the associated pawl 42 inwardly toward cams 32 and 34 and the ratchet wheel portion 48 of output member 16. The ratchet wheel portion 48 is an enlarged diameter portion having a plurality of circumferentially-arranged teeth 49. The pawls 42 coact with camming surfaces 40 upon relative angular movement of input member 14 and inertia member 18 to pivotally move pawls 42 out of engagement with a tooth of ratchet wheel portion 48 of output member 16 (see FIG. 5) and allow the pawls to engage other teeth 49 of the ratchet wheel portion 48 of the output member.

The output member 16, in addition to ratchet wheel portion 48, has two oppositely extending cylindrical journal portions 50 and 52 which are receivable within bores 38 of cams 32 and 34. While cams 32 and 34 serve as bushings to radially support output member 16, axial thrust is taken up by a ball bearing 54 disposed in a recess 56 in disk-portion 24 and engaging the end surface of journal portion 50 of output member 16. The output member adjacent and integral with journal portion 52 has a substantially square end portion 55 for receiving fastener engaging members, such as detachable socket members (not shown).

Similar to output member 16, input member 14 has an axially extending hub portion 57 which, in cross-section, may have a polygonal shape and adapted to be gripped by the jaws of a chuck or collet 58 on motor 12 (See FIG. 1). In the alternative, hub portion 56 may be provided with a polygonal-shaped axial recess 60 (shown in dot-dash lines in FIG. 3) into which a mating male member (not shown) is receivable for rotatively connecting input member 14 with a source of rotary power.

The spring assembly 20, according to this invention, comprises a plurality of sets 62 of helically coiled tension springs 64. As shown, there may be three sets 62 circumferentially spaced from each other adjacent the outer peripheral surface of inertia member 18. The springs 64 of each set are disposed in side-by-side relationship to each other. Each set 62 may comprise, as shown, five springs 64, thus providing a total of fifteen springs. Each spring is anchored at one end to the input member 18 by way of a rod 66 which extends parallel to axis A—A and between disk portion 24 and ring portion 22 of input member 14. Each of the rods 66 is secured to input member 14 by split washers 67 inserted in annular grooves adjacent each end of the associated rod. The opposite end of each spring 64 is secured to inertia member 18 by connection to a bolt 68 which is turned into a threaded bore in inertia member 18. As is clearly illustrated in FIG. 5, relative angular movement between input member 14 and inertia member 18 will place springs 64 of each set 62 in tension and, when cams 32 and 34 pivot pawls 42 out of engagement with teeth 49 of ratchet wheel portion 48, the inertia member 18 is accelerated in an overhauling direction and, when the cams 32 and 34 allow the pawls 42 to drop into alignment with teeth 49, pawls 42 are carried into impact against teeth 49 of the ratchet wheel portion 48 to thereby rotatively drive output member 16. In rotary impact mechanism 10 shown in FIGS. 1 to 5 wherein ratchet wheel portion 48 has 12 teeth, the relative rotation between the cams 32 and 34 (including input member 14) and output member 16 is a maximum of 38 degrees. As long as input member 14 is rotated, this escapement and impact-producing re-engagement of the pawls 42 with the teeth 49, as a function of angular movement of input member 14 in over-running or overhauling relation in one direction to output member 16 and inertia member 18, will occur to effect tightening or loosening of a fastener. Since the spring assembly provides, as illustrated in the drawings, as many as fifteen springs 64, the rotary impact mechanism 10 can be adjusted by an operator very accurately in relation to the size or grade fasteners, such as nuts and bolts, within the range of the mechanism by either eliminating springs 64 or substituting springs 64 of different tension ratings or combinations of spring omissions and substitutions.

A cover 70, in the form of a metal band or strip, is disposed to seat within juxtaposed annular shoulders in the ring and disk portions 22 and 24 of input member 14. The cover 70 is held in place by a seal 72 which is in the form of an annular resilient sleeve and stretched over the cover 70 and the peripheral edges of ring and disk portions 22 and 24 of input member 14. The cover 70 and seal 72 function to retain lubricant within the mechanism and to maintain the mechanism free from contaminants such as dust, dirt and water.

In the field use of mechanism 10, adjustment of the shock or impact torque output of the mechanism can be achieved by an operator relatively quickly and easily. First, the seal 72 is slipped from the mechanism and cover 70 removed to thus expose springs 64. If one or more springs 64 are to be removed or changed, removal of a selected spring 64 is accomplished by turning and removing the associated anchor bolt 68 from inertia member 18 and unhooking the opposite end of the spring from rod 66. If a spring is to be replaced, the replacement spring may be installed by inserting anchor bolt 68 through the loop at one end of the spring, turning the bolt into its threaded recess and thereafter hooking the opposite end of the replacement spring to the adjacent rod 66. After the operator has accomplished the removal and/or replacement of all of the springs to be removed and/or replaced, lubricant, if required, is added and the cover 70 and seal 72 are replaced on input member 14.

Figure 6:
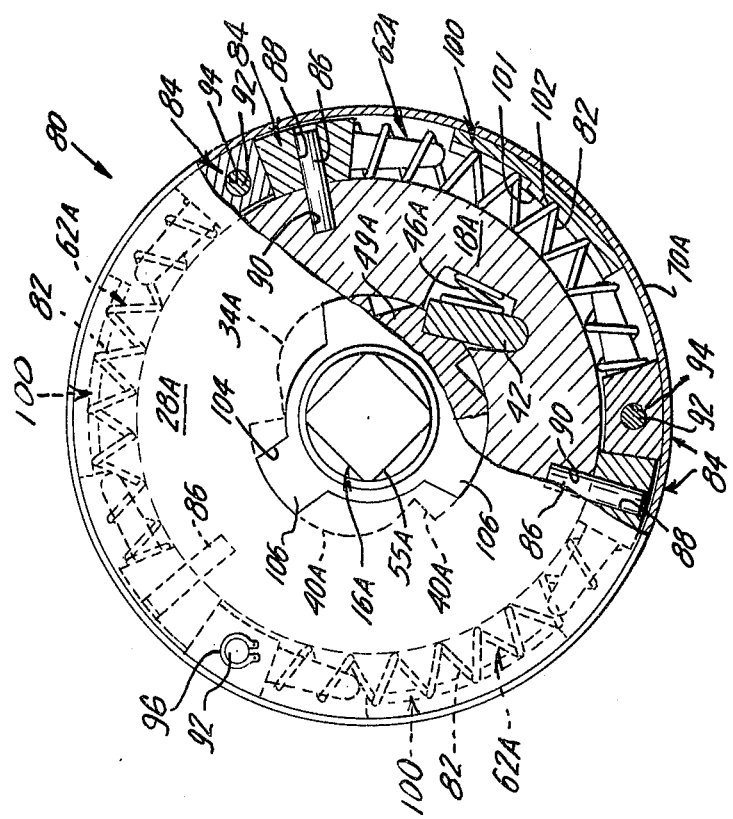
FIG. 6 is an end elevational view, similar to FIG. 2, and with parts broken away, showing a rotary impact mechanism according to a second embodiment of this invention.
Figure 7:
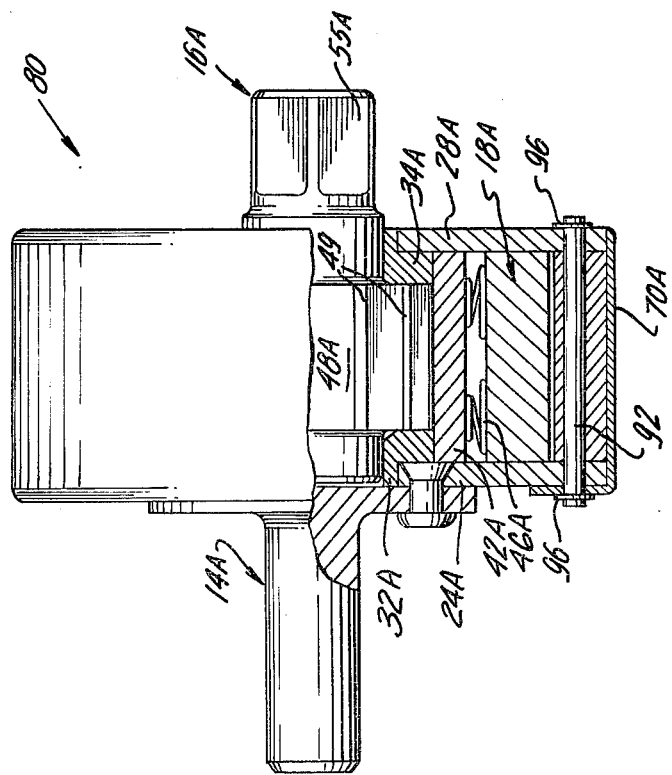
FIG. 7 is a side-elevational view of the rotary impact mechanism shown in FIG. 6 with parts broken away for illustration purposes only.

In FIGS. 6 and 7 is shown a rotary impact mechanism 80 which differs principally from rotary impact mechanism 10 of FIGS. 1 to 5 in that the spring assembly comprises compression springs rather than tension springs 64 which comprise the spring assembly of rotary impact mechanism 10. Since all other components of rotary impact mechanism 80 are substantially the same as those components of mechanism 10, parts of mechanism 80 corresponding to like parts of mechanism 10 will be designated by the same number but with a suffix A added thereto.

As is shown in FIGS. 6 and 7, rotary impact mechanism 80 comprises a plurality of sets 62A of compression springs 82, each set 62A consisting of a plurality of springs 82 disposed adjacent the peripheral surface of inertia member 18A in side-by-side relationship to each other. To anchor the ends of each of the springs 82 and also to support and guide springs 82 in their extension and compression, a pair of guide blocks 84 are provided for each of the spring sets.

Figure 8:
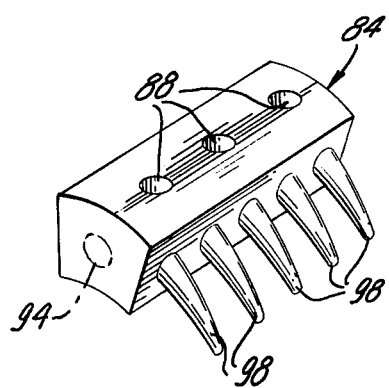
FIG. 8 is a view in perspective of a spring guide block employed in the rotary impact mechanism shown in FIGS. 6 and 7.

As best shown in FIG. 8, each guide block 84 comprises a generally rectangular-shaped body portion having two opposite side surfaces of a curvature complementary to that of the adjacent surfaces of inertia member 18A and a cover 70A. One of the pair of guide blocks 84 is secured to inertia member 18A by a plurality of pins 86 (only one for each guide block being shown in FIG. 6) which pass through registered openings 88 and 90, respectively, in guide block 84 and inertia member 18A. The other guide block 84 for each set 62A of springs is secured to input member 14A by a rod 92 which passes through aligned openings in the associated guide block 84 (an opening 94, shown in phantom lines in FIG. 8), cover 70A, disk portion 24A and end plate 28A of input member 14A. The rod 92 is secured in place by split washers 96 receivable in annuli adjacent opposite ends of the rod. The rods 92, in addition to connecting the guide blocks 84 to input member 14A, serve to secure plate 28A to disk portion 24A and cover 70A to those portions of input member 14A. In addition, guide blocks 84 which are secured to the input member 14A are the functional equivalents of ribs 26 of mechanism 10. Each of the guide blocks 84 has a plurality of fingers 98, one for each spring. Each of these fingers 98 project from one side of the guide block and into the coils of a spring. These fingers 98 help to prevent buckling of the spring as it is being compressed. To further guide and support springs 84, a guide plate 100 is provided.

As shown only in FIG. 6, each guide plate 100 for each set 62A of springs 82 comprises a strip of self-lubricating material as, for example, Delrin, which is provided with a plurality of arcuate troughs 102, in one surface thereof, one trough being provided to receive a spring. Each guide plate 100 is free to slide on the inner surface of cover 70A with movement of the springs. A lug 101 for each spring 82 is provided to fit between and engage the coils of the spring so that guide plate 100 moves with the central portions of the springs and thereby reduces buckling drag on cover 70A.

In this mechanism 80, cams 32A and 34A are rotatively secured to the respective end plates 24A and 28A by a tongue and groove interconnection. As only shown in FIG. 6, plates 24A and 28A have a plurality of radially extending grooves 104 into which fit radial tongues 106 of cams 32A and 34A.

In operation of mechanism 80 and assuming the fastener (not shown) to which output member 16A is connected offers sufficient resistance to cause input member 14A to overrun output member 16A, springs 82 are compressed between guide blocks 84 as input member 14A rotatively moves relative to inertia member 18A. Thus, energy is stored in the springs as a result of this compression while simultaneously cams 32A and 34A act to force pawls 42A out of engagement with the teeth 49A of ratchet wheel portion 48A. When the pawls 42A are moved out of engagement with teeth 49A of ratchet wheel portion 48A of the output member 16A, inertia member 18A is accelerated by the force of springs 82 and, when pawls 42A are allowed by the profile or camming surfaces 40A of cams 32A and 34A to drop inwardly into rotative alignment with teeth 49A, pawls 40A impact against the next teeth 49A to thus rotate output member 16A and the fastener (not shown) to which it is attached. This escapement and impact-producing re-engagement of pawls 40A continues until the fastener is tensioned to the desired degree.

Figure 9:
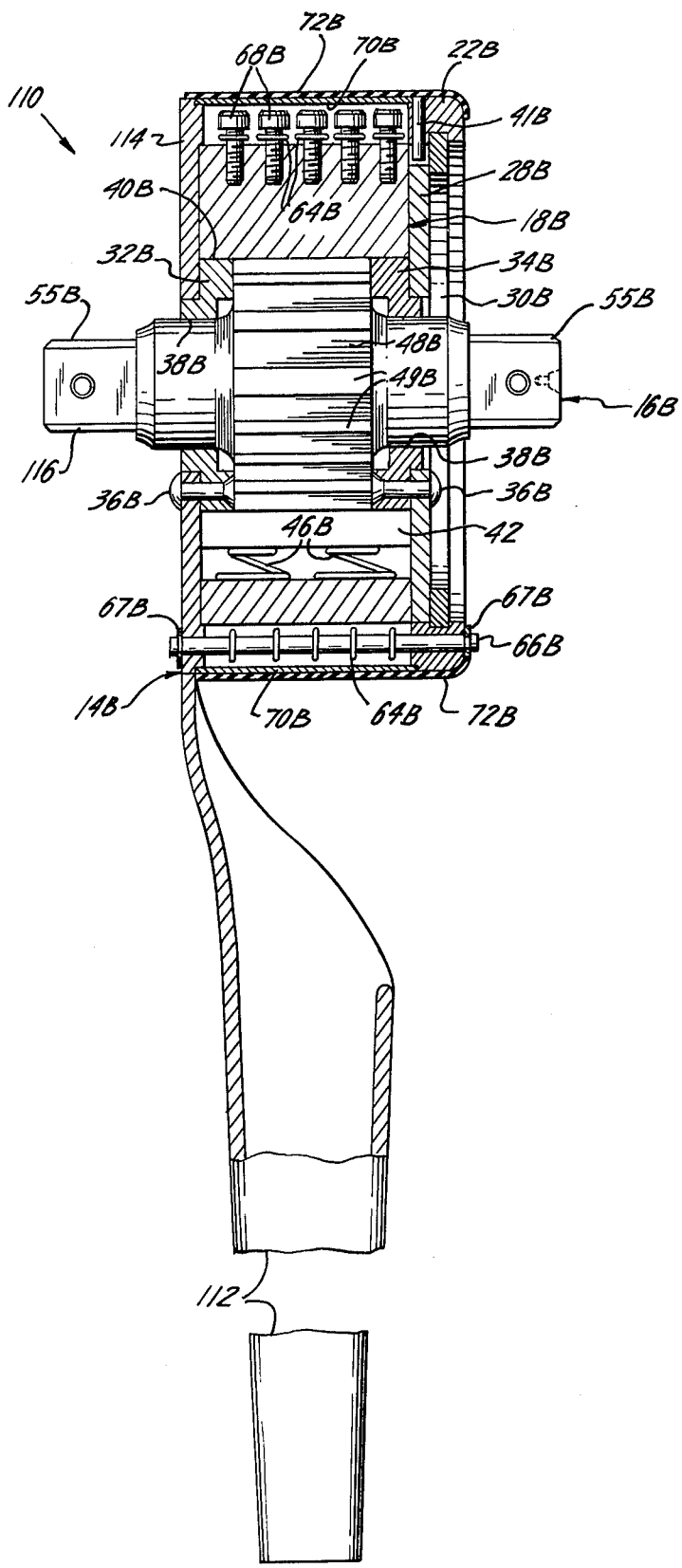
FIG. 9 is a view in cross-section of a rotary impact mechanism, according to a third embodiment, which mechanism is manually operated.

In FIG. 9 is shown a rotary impact mechanism 110, according to a third embodiment of this invention. The rotary impact mechanism 110 principally differs from the rotary impact mechanisms 10 and 80 in that rotary input power is manually applied rather than by way of a motor as in the mechanisms 10 and 80. Accordingly, the parts of rotary impact mechanism 110 corresponding to like parts of mechanism 10 will be designated by the same number but with the suffix B added thereto.

As shown in FIG. 9, rotary mechanism 110 has a handle 112 which forms part of the housing or input member 14B. The input member 14B comprises, in place of disk portion 24 of mechanism 10, an end plate 114 which is suitably connected or integral with handle 112. In all other respects, input member 14B is structurally the same as input member 14 of mechanism 10.

The output member 116 is similar to output member 16 of mechanism 10 except that it has juxtaposed square end portions 54B, instead of one, for receiving fastener engaging members, such as detachable socket members (not shown). The output member 116 is journaled for rotation in cams 32B and 34B which are respectively attached to end plate 114 and end plate 28B.

The other parts and components of rotary impact mechanism 110 and their function are the same as has been described for rotary impact mechanism 10.

The basic difference, as previously stated, between mechanism 110 and mechanism 10, is that in mechanism 110 rotary input is manually applied to input member 14B via handle 112 instead of through a motor 12 as is the case for mechanism 10. Therefore, the operation of mechanism 110 is the same as previously described for mechanism 10 except that rotary input force is intermittent rather than continuous.

It is believed now readily apparent that the present invention provides a rotary impact mechanism of the type having a spring accelerated inertia member which can be quickly and easily adjusted by an operator in the field to provide the optimum effective tensioning of a fastener commensurate with such fastener's size or grade. It is a rotary impact mechanism which is capable of having a continuous rotating power input. It is also a mechanism which can serve as an attachment to conventional rotary power tools having electric or fluid driven motors to amplify the output effectiveness of the rotary power tools.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a rotary impact mechanism of the type comprising an input member, an output member and an inertia member, all approximately symmetrical about a common axis and journaled upon each other at mating mutually telescoping circular surfaces thereof for independent angular movement about said axis, said output member having a plurality of circumferential spaced teeth, at least one pawl carried by the inertia member for angular movement therewith and biased for engagement with said teeth and capable of movement to disengage the teeth, a cam on the input member operative on the pawl as a function of relative angular movement of the input member and inertia member in the direction to force the pawl out of engagement with one tooth of said teeth and release such pawl for engagement with another tooth to impact thereagainst and rotatively drive the output member, the improvement comprising:
   (a) the inertia member being disposed within the input member and being of smaller radial dimensions than the radial dimensions of the input member to form therebetween a peripheral recess;
   (b) a plurality of helical springs disposed in said peripheral recess and adjacent the outer peripheral surface of the inertia member;
   (c) each of the springs being anchored at one end to the inertia member and at the opposite end to the input member so that upon relative rotative movement between the input and inertia members, the springs store energy and thereafter function to rotatively drive said inertia member when the pawl is disengaged from said one tooth; and
   (d) a cover overlying said peripheral recess and detachably connected to the input member so as to be removable and thereby expose the springs for removal and/or replacement.

2. The apparatus of claim 1 wherein said plurality of springs are arranged in spaced, circumferential relation around the inertia member.

3. The apparatus of claim 1 wherein said plurality of springs comprise a plurality of circumferentially-spaced sets, each of which sets comprises two or more springs arranged in side-by-side relation to each other.

4. The apparatus of claim 1 wherein said plurality of springs are removable so as to change the degree of loading and hence the impact force output of the mechanism.

5. The apparatus of claim 1 wherein said springs are tension springs which, when loaded, are placed in tension.

6. The apparatus of claim 1 wherein said springs are compression springs which, when loaded, are placed in compression.

7. The apparatus of claim 1 wherein said input member has means for rotative coupling to a source of rotary power.

8. The apparatus of claim 7 wherein said source is a motor means.

9. The apparatus of claim 7 wherein said souce is a manually actuatable handle.

10. The apparatus of claim 1 wherein a seal means coacts with said cover to keep the peripheral recess free of contaminants.

* * * * *